United States Patent
Dong

(10) Patent No.: US 11,170,280 B2
(45) Date of Patent: Nov. 9, 2021

(54) ELECTRONIC SHELF LABEL AND CONTROL METHOD THEREFOR, AND COMPUTING DEVICE AND SYSTEM

(71) Applicants: Beijing BOE Technology Development Co., Ltd., Beijing (CN); BOE TECHNOLOGY GROUP CO., LTD., Beijing (CN)

(72) Inventor: Wenchu Dong, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/765,370

(22) PCT Filed: Sep. 19, 2019

(86) PCT No.: PCT/CN2019/106636
§ 371 (c)(1),
(2) Date: May 19, 2020

(87) PCT Pub. No.: WO2020/057591
PCT Pub. Date: Mar. 26, 2020

(65) Prior Publication Data
US 2020/0342279 A1    Oct. 29, 2020

(30) Foreign Application Priority Data
Sep. 20, 2018  (CN) .......................... 201811102087.8

(51) Int. Cl.
*G06K 19/07* (2006.01)
*G06K 17/00* (2006.01)

(52) U.S. Cl.
CPC ..... *G06K 19/0723* (2013.01); *G06K 17/0029* (2013.01)

(58) Field of Classification Search
CPC ....................... G06K 19/0723; G06K 17/0029
(Continued)

(56) References Cited

U.S. PATENT DOCUMENTS

2006/0163349 A1* 7/2006 Neugebauer ........... G06Q 30/02
                                                            235/383
2010/0001924 A1   1/2010 Nobutsugu et al.
(Continued)

FOREIGN PATENT DOCUMENTS

| CN | 102571631 A | 7/2012 |
| CN | 103533438 A | 1/2014 |

(Continued)

OTHER PUBLICATIONS

International Search Report and Written Opinion dated Dec. 25, 2019 for PCT Patent Application No. PCT/CN2019/106636.
(Continued)

*Primary Examiner* — Allyson N Trail
(74) *Attorney, Agent, or Firm* — Thomas | Horstemeyer, LLP

(57) ABSTRACT

A method for controlling an electronic shelf label includes identifying a user type; retrieving a task type matching the user type from at least one preset task type according to the user type, the user type including at least one of a gender or an age of the user; generating a task based on the retrieved task type; presenting the task; and transmitting the task to an electronic shelf label.

11 Claims, 4 Drawing Sheets

(58) Field of Classification Search
USPC .............................. 235/385, 383; 705/14.58
See application file for complete search history.

(56) References Cited

U.S. PATENT DOCUMENTS

| | | | |
|---|---|---|---|
| 2010/0287057 A1 | 11/2010 | Aihara et al. | |
| 2013/0218721 A1* | 8/2013 | Borhan ................. | G06Q 30/02 705/26.41 |
| 2014/0143060 A1* | 5/2014 | Fernandez ............ | H04W 4/021 705/14.58 |
| 2015/0356610 A1* | 12/2015 | Ponoth ............... | G06Q 30/0261 705/14.58 |

FOREIGN PATENT DOCUMENTS

| | | |
|---|---|---|
| CN | 104320443 A | 1/2015 |
| CN | 205005089 U | 1/2016 |
| CN | 205068487 U | 3/2016 |
| CN | 106202165 A | 12/2016 |
| CN | 106682113 A | 5/2017 |
| CN | 107992507 A | 5/2018 |
| CN | 108335148 A | 7/2018 |
| EP | 2181626 A1 | 5/2010 |
| TW | 201322116 A | 6/2013 |

OTHER PUBLICATIONS

1st Office Action dated Sep. 30, 2020 for Chinese Patent Application No. 201811102087.8.

\* cited by examiner

US 11,170,280 B2

ELECTRONIC SHELF LABEL AND CONTROL METHOD THEREFOR, AND COMPUTING DEVICE AND SYSTEM

CROSS REFERENCE TO RELATED APPLICATIONS

The present application is a § 371 national phase application based on International Application No. PCT/CN2019/106636, filed on Sep. 19, 2019, which is based upon and claims priority to Chinese Patent Application No. 201811102087.8 filed on Sep. 20, 2018, the disclosures of which being incorporated by reference in their entirety herein.

TECHNICAL FIELD

The present disclosure relates to the field of electronic shelf labels and, in particular, to an electronic shelf label, a method executed by an electronic shelf label, a method for controlling an electronic shelf label, a computing device, and a system for controlling an electronic shelf label.

BACKGROUND

Electronic shelf labels have seen increasingly widespread application. At present, the application scope and function of electronic shelf labels are limited to displaying prices of goods.

SUMMARY

According to one aspect of the present disclosure, there is provided a method for controlling an electronic shelf label, including: identifying a user type; retrieving a task type matching the user type from at least one preset task type according to the user type, the user type including at least one of a gender or an age of the user; generating a task based on the retrieved task type; presenting the task; and transmitting the task to an electronic shelf label.

In some embodiments, the task includes a plurality of tasks; and presenting the plurality of tasks, and transmitting the tasks to an electronic shelf label specifically includes: presenting the plurality of tasks; and transmitting the plurality of tasks to a plurality of corresponding electronic shelf labels, respectively.

In some embodiments, the method further includes receiving task execution results of the electronic shelf labels; and generating information related to the plurality of electronic shelf labels based on the task execution results.

In some embodiments, receiving task execution results of the electronic shelf labels includes receiving task execution results of the electronic shelf labels from the user.

In some embodiments, generating information related to the plurality of electronic shelf labels based on the task execution results includes: when the task execution result is an intermediate result, the generated information related to the plurality of electronic shelf labels includes the next task; or, when the task execution result is a final result, the generated information related to the plurality of electronic shelf labels includes favor information of products corresponding to the plurality of electronic shelf labels.

In some embodiments, generating a plurality of tasks based on the retrieved task type includes simultaneously generating a plurality of tasks based on the retrieved task type; presenting the plurality of tasks includes presenting the plurality of tasks simultaneously; and transmitting the plurality of tasks to a plurality of corresponding electronic shelf labels includes transmitting the plurality of tasks to a plurality of corresponding electronic shelf labels simultaneously.

In some embodiments, generating a plurality of tasks based on the retrieved task type includes: sequentially generating a plurality of tasks based on the retrieved task type and/or task execution results from a plurality of electronic shelf labels; presenting the plurality of tasks includes: sequentially presenting the plurality of tasks; and transmitting the plurality of tasks to a plurality of corresponding electronic shelf labels includes: transmitting the plurality of tasks to a plurality of corresponding electronic shelf labels sequentially.

According to one aspect of the present disclosure, there is provided a method executed by an electronic shelf label, including: receiving a task; presenting the task; identifying the user executing the presented task; and generating a task execution result based on the user executing the presented task.

In some embodiments, the method further includes transmitting the task execution result.

In some embodiments, the method further includes retrieving a task from a preset task library based on the received task, wherein the retrieved task is a detailed task corresponding to a code or a short name of the received task; and presenting the task includes presenting the retrieved task.

In some embodiments, the method further includes: when the task is executing, receiving another task; presenting said another task; identifying the user executing said another task presented; and generating a task execution result based on the user executing said another task presented.

According to one aspect of the present disclosure, there is provided a computing device for controlling an electronic shelf label, including: an identification apparatus configured to identify a user type; a retrieval apparatus configured to retrieve a task type matching the user type from a plurality of preset task types according to the user type; a task generation apparatus configured to generate a task based on the retrieved task type; a presentation apparatus configured to present the task; and a transmitting apparatus configured to transmit the task to an electronic shelf label.

In some embodiments, the task generated by the task generation apparatus is a plurality of tasks, the presentation apparatus is configured to present the plurality of tasks, and the transmitting apparatus is configured to transmit the plurality of tasks respectively to a plurality of corresponding electronic shelf labels.

In some embodiments, the computing device further includes: a receiving apparatus configured to receive task execution results of the plurality of electronic shelf labels; and wherein the task generation apparatus is configured to generate information related to the plurality of electronic shelf labels based on the task execution results.

In some embodiments, the task generation apparatus is configured to generate a plurality of tasks simultaneously based on the retrieved task type, the presentation apparatus is configured to simultaneously present the plurality of tasks, and the transmitting apparatus is configured to simultaneously transmit the plurality of tasks to a plurality of corresponding electronic shelf labels, respectively.

In some embodiments, the task generation apparatus is configured to sequentially generate a plurality of tasks based on the retrieved task type and/or task execution results from a plurality of electronic shelf labels; the presentation apparatus is configured to sequentially present the plurality of tasks, and the transmitting apparatus is configured to sequentially transmit the plurality of tasks to the plurality of corresponding electronic shelf labels, respectively.

According to one aspect of the present disclosure, there is provided an electronic shelf label, including: a processor; and a memory for storing executable instructions of the processor; wherein the processor is configured to: receiving a task; presenting the task; and identifying the user executing the presented task; and generating a task execution result based on the user executing the presented task.

In some embodiments, the processor is further configured to: transmit the task execution result.

According to still one aspect of the present disclosure, there is provided a system for controlling an electronic shelf label. The system may include: a computing device described above, and a plurality of electronic shelf labels described above.

According to still one aspect of the present disclosure, there is provided a computer-readable storage medium containing computer-executable instructions, the computer-executable instructions, when being executed by one or more processors, cause the one or more processors to execute the method described above.

BRIEF DESCRIPTION OF THE DRAWINGS

In order to explain the embodiments of the present disclosure more clearly, the embodiments of the present disclosure are described in detail below with reference to the accompanying drawings. The embodiments of the present disclosure are intended to explain the present disclosure and should not be construed as limiting the present disclosure. In the drawings, the same or similar reference numerals indicate the same or similar elements.

DETAILED DESCRIPTION

An electronic shelf label in the related art is only used to display a price of goods. Its function is monotonous and the user experience is poor.

In order to overcome one of the defects of the electronic shelf labels in the related art, the present disclosure provides a method for controlling an electronic shelf label, a method executed by an electronic shelf label, a computing device for controlling an electronic shelf label, an electronic shelf label, a system for controlling the electronic shelf label, and a non-transitory computer-readable storage medium. They can enable users to execute various tasks based on electronic shelf labels, thereby satisfying users' demands in learning and entertainment while satisfying their demands in shopping, which can improve the user's shopping experience.

The present disclosure will be described below based on a scenario such as a mall or a supermarket. However, those skilled in the art should realize that the present disclosure is not limited to these application scenarios.

Figure 1:
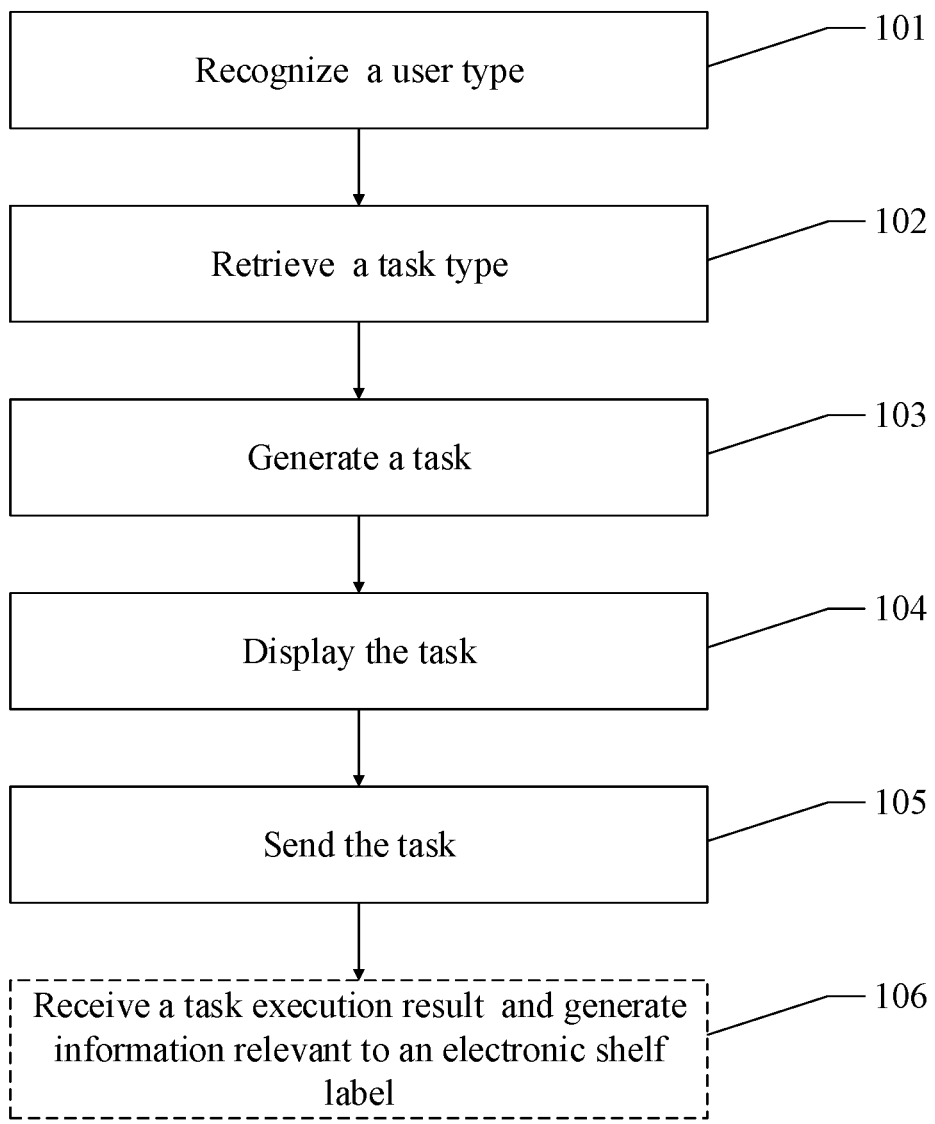
FIG. 1 is a schematic flowchart of a method for controlling an electronic shelf label according to an embodiment of the present disclosure.

FIG. 1 is a schematic flowchart of a method 100 for controlling an electronic shelf label according to an embodiment of the present disclosure. The method 100 may be executed by a computing device, such as a computing device 400 which will be described in detail later.

As shown in FIG. 1, the method 100 may include step 101, in which a user type is identified.

This step 101 may be executed, for example, by a camera. From a photo of the user taken by the camera, the user's gender (for example, man or woman) can be first identified, and then the user's age (for example, elderly, youth, or child) is further identified. Thus, in some embodiments, user types may include men and women. Of course, in other embodiments, the user types can be further subdivided into old men, young men, boys, old women, young women, and girls. These are just some examples of the user types according to the present disclosure. The user types according to the present disclosure may not be limited to this, but may be set according to an actual situation.

Thereafter, the method 100 may proceed to step 102. At step 102, a task type matching the user type is retrieved from a plurality of preset task types according to the identified user type. The user type includes at least one of a gender or an age of the user.

The plurality of preset task types may be pre-configured for various predefined user types and stored in a database in advance. Each user type can correspond to one or more task types. When a certain user type corresponds to a plurality of task types, the user may select which one of the plurality of task types to execute. Each task type may include at least one task that needs to be executed by a user. For example, if the identified user type is "girl", the task type "Dressing up as the Snow Queen" that matches the "girl" can be retrieved. The task type of "Dressing up as the Snow Queen" may include a plurality of task types, such as "Please answer the name of the Snow Queen", "Please imitate the dance of the Snow Queen on the screen", and so on.

Thereafter, the method 100 may proceed to step 103. At step 103, a task is generated according to the retrieved task type. The generated task may be one or more tasks.

In some embodiments, the generated tasks are a plurality of tasks, and the plurality of tasks may be generated simultaneously based on the retrieved task type. In this embodiment, the plurality of tasks may be tasks that are independent of each other. Therefore, the plurality of tasks can be generated simultaneously without affecting each other.

In other embodiments, the plurality of tasks may be sequentially generated based on the retrieved task type. In this embodiment, the plurality of tasks may be tasks that are closely related to each other. Since the plurality of tasks need execution results of other tasks as a basis for determination (the content of the next task depends on the user's completion of the previous task), they cannot be generated at the same time. In this embodiment, when generating the plurality of tasks, in addition to the retrieved task type, the task execution results from a plurality of electronic shelf labels may also be used as a basis for determination. Continuing with the "Dressing up as the Snow Queen" task type described earlier, in this task type, a determination condition can be set for each task in order to determine the next task that the user needs to execute according to the execution result of the task. Assuming that for the above task "Please answer the name of the Snow Queen", if the user's execution result for the task is correct, the next task may be the task "Please imitate the Snow Queen's dancing posture on the screen." If the user's execution result for the task is wrong, the next task can be the task "End the game, please return to the service desk to collect the prize" or the task "Please answer the name of the Snow Queen's sister".

The method 100 may proceed to step 104. At step 104, the generated task is presented. If the generated task is one task, only one task needs to be presented. If the generated task is a plurality of tasks, the plurality of tasks need to be presented.

Generally, after the plurality of tasks are generated, the plurality of tasks need to be presented to the user so that the user can know the tasks to be executed. While presenting the plurality of tasks, an electronic shelf label corresponding to each task may also be presented at the same time, so that the user can go to each corresponding electronic shelf label to execute task according to the presented task. According to the present disclosure, presenting the plurality of tasks may be implemented by a text, an image, sound, or the like.

In the above embodiment in which a plurality of tasks are generated simultaneously, presenting the plurality of tasks may include presenting the plurality of tasks simultaneously.

Figure 4:
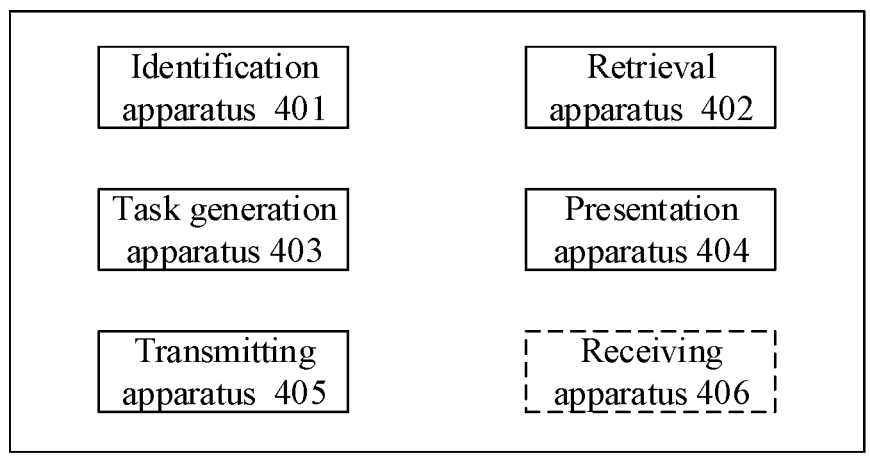
FIG. 4 shows a schematic block diagram of a computing device that controls an electronic shelf label according to an embodiment of the present disclosure.

In the above embodiment in which a plurality of tasks are sequentially generated, presenting the plurality of tasks may include sequentially presenting the plurality of tasks. In this embodiment, the user can at first see only the first task that needs to be executed and/or the electronic shelf label corresponding to the first task. Thereafter, the second task will be presented according to the execution result of the first task by the user, the third task will be presented according to the execution result of the second task by the user, and so on. It should be noted that the second task may be presented only by an electronic shelf label presenting the first task, or may be presented simultaneously by the computing device 400 that transmits the task, for example, as shown in FIG. 4. The three tasks may be presented only by the electronic shelf label presenting the second task, or may be presented simultaneously by the computing device 400 that transmits the tasks, for example, as shown in FIG. 4, and so on.

Thereafter, the method 100 may proceed to step 105. At step 105, the plurality of tasks are transmitted to a plurality of corresponding electronic shelf labels, respectively. The transmission of the plurality of tasks to the plurality of electronic shelf labels follows a short-range communication protocol including RFID.

In the above embodiment in which a plurality of tasks are generated simultaneously, transmitting the plurality of tasks to the plurality of corresponding electronic shelf labels may include transmitting the plurality of tasks to the plurality of corresponding electronic shelf labels at the same time, respectively.

In the above embodiment in which a plurality of tasks are sequentially generated, transmitting the plurality of tasks to a plurality of corresponding electronic shelf labels may include sequentially transmitting the plurality of tasks to a plurality of corresponding electronic shelves labels respectively. In this embodiment, after the user executes a task once at an electronic shelf label, the execution result of the task is returned to the computing device that transmitted the task. Then, the computing device generates a next task based on the execution result of the task, and transmits a prompt for the next task to the electronic shelf label and/or transmits the next task to another electronic shelf label corresponding to the next task, so that the user can proceed to execute the next task.

In some embodiments, the method 100 may end at step 105. In this embodiment, the user can learn knowledge and experience fun in the process of executing various tasks, thereby improving the user's experience.

In other embodiments, the method 100 may proceed to step 106. At step 106, task execution results of a plurality of electronic shelf labels may be received, and information related to the plurality of electronic shelf labels may be generated based on the task execution results. Receiving task execution results of a plurality of electronic shelf labels may be simultaneously receiving a plurality of task execution results, or sequentially receiving a plurality of task execution results. The receiving may be executed by a user or by the plurality of electronic shelf labels themselves. Generating information related to the plurality of electronic shelf labels based on the task execution results includes: if the task execution result is an intermediate result, the generated information related to the plurality of electronic shelf labels including a next task; alternatively, if the execution result of the task is a final result, the generated information related to the plurality of electronic shelf labels including favor information of products corresponding to the plurality of electronic shelf labels. In some embodiments, the user may collect information related to the task execution result generated by the electronic shelf label at each electronic shelf label or collect an overall task execution result related to all of the plurality of tasks at the last electronic shelf label. After collecting the plurality of task execution results or the overall task execution result, the user may return to the computing device (e.g., a service desk) that transmitted the task, and input the collected plurality of task execution results or the overall task execution result to the computing device so that the computing device receives these task execution results or the overall task execution result and generates information related to the plurality of electronic shelf labels. For example, the information related to the task execution result which is generated by the electronic shelf label may be a barcode or a two-dimensional code. The user can enter a barcode or a QR code into a computing device by scanning it. The information related to the plurality of electronic shelf labels may include favor information corresponding to the products on the electronic shelf labels. For example, the favor information may be discount information or a coupon or a promotion notice. Users can enjoy discounts based on this discount information or coupons, thereby further improving the user's shopping experience. In other embodiments, as described above, the electronic shelf label may return the execution result of the task to the computing device itself. In this case, the computing device may generate corresponding information related to the electronic shelf label based on the returned task execution result (an individual task execution result or an overall task execution result), and transmit the information related to the electronic shelf label to the corresponding electronic shelf label.

The steps provided by the embodiments of the present disclosure may be executed by a processor integrated in a computer device, such as the computing device 400 described in detail later. The processor may include a hardware processor or one or more hardware processors.

Figure 2:
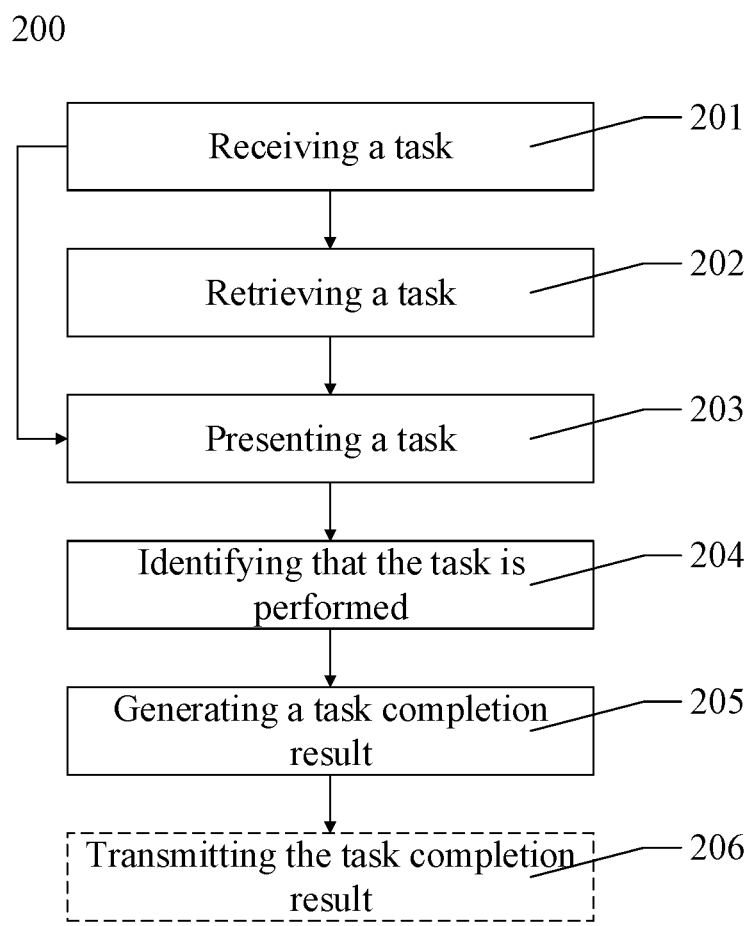
FIG. 2 is a schematic flowchart of a method executed by an electronic shelf label according to an embodiment of the present disclosure.

FIG. 2 is a schematic flowchart of a method 200 executed by an electronic shelf label according to an embodiment of the present disclosure. The method 200 may be executed by an electronic shelf label (e.g., an electronic shelf label 500 described in detail later).

As shown in FIG. 2, the method 200 may start at step 201. At step 201, a task is received. The task may be received from a computing device 400 as shown in FIG. 4.

Next, the method 200 may proceed to step 202. At step 202, a task is retrieved from a preset task library based on a received task, and the retrieved task is a detailed task corresponding to a code or a short name of the received task. In this embodiment, the received task may be, for example, only one task code or a short name, and a preset task library stores detailed tasks corresponding to the task code or the short name. This setting can reduce the communication volume of the entire system, thereby increasing the operating speed of the entire system.

Next, the method 200 may proceed to step 203. At step 203, a task is presented. In this embodiment, the presented task may be the retrieved task. The presented task can be known by the user so that the user can execute the task.

Figure 5:
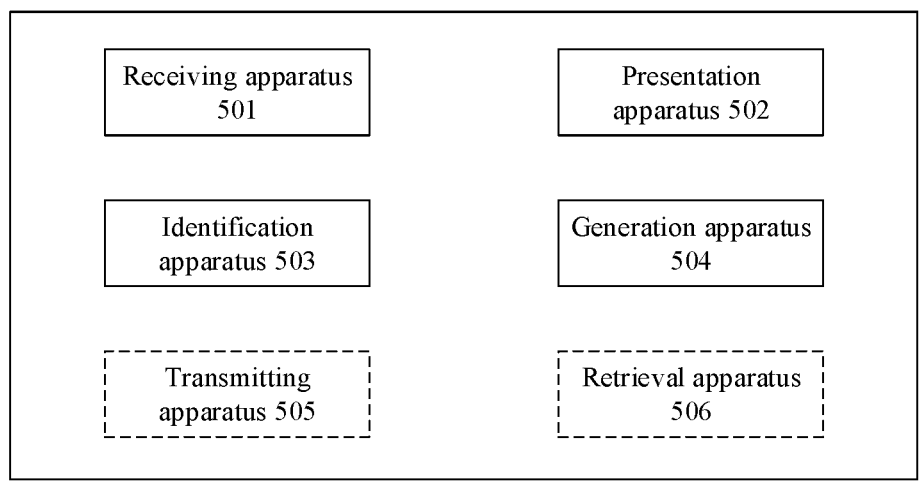
FIG. 5 is a schematic block diagram of an electronic shelf label according to an embodiment of the present disclosure.

As shown in FIG. 2, after step 201, the method 200 may also proceed directly to step 203. In this embodiment, the presented task is received directly from, for example, a computing device as shown in FIG. 5.

After step 203, the method 200 may proceed to step 204. At step 204, the electronic shelf label will identify that the presented task is executed by a user. The user executing the presented task may include inputting information with a keyboard, a touch screen and the like, presenting actions with a camera, inputting sound with a microphone, and the like. Identifying the user executing the presented task may be determining whether the information input through the keyboard, touch screen and the like is consistent with the pre-stored information, it may be determining whether the presented action captured by the camera is consistent with the pre-stored action information, or it may be determining whether the sound input through the microphone is consistent with the pre-stored sound information and so on.

After step 204, the method 200 may proceed to step 205. At step 205, the electronic shelf label will generate a task execution result based on the user executing the presented task. Task execution result may include being correct, being wrong, or a similarity between the action presented and the action on the screen, and so on. The task execution result can be set according to the actual situation. According to the present disclosure, the electronic shelf label can present the generated task execution result to the user. The presentation can be implemented by, for example, a text, an image, or sound. The task execution result may be a barcode or a two-dimensional code.

In some embodiments, as shown in FIG. 2, the method 200 may further include step 206, transmitting the generated task execution result to the computing device 400 that transmitted the task, such as shown in FIG. 4, so that the computing device generates the next task or related information related to the electronic shelf label based on the task execution result.

In some embodiments, when executing various steps of the method 200 (e.g., steps 201, 202, 203, 204, 205, and 206), the method 200 may further include receiving another task. Upon receiving said another task, executing of the current task may be suspended or terminated. In this case, the electronic shelf label may present said another task upon receiving said another task; identify the user executing said another presented task; and generate a task execution result based on the user executing said another presented task, and so on.

In some embodiments, the method 200 may further include, upon receiving another task, determining the priority of said another task, and determining whether to continue the current task or to suspend the current task to execute said another task. Specifically, while executing the current task, upon receiving another task, the priority of said another task is determined, for example, based on set specific conditions, and when said another task meets these conditions, it is determined that said another task has a high priority, the current task is terminated, and said another task is executed, including presenting said another task; identifying a user executing said another presented task; and based on the user executing said another presented task, generating a task execution result. When the other task does not satisfy these conditions, it is determined that the priority of said another task is not high, and then the current task is continued to be executed. The another task is put into a queue after the current task, and after the executing of the current task ends, presenting said another task again; identifying a user executing said another presented task; and generating a task execution result based on the user executing said another presented task. The specific set condition may be, for example, when it is determined as another task of the same user, determining that the user needs to change the task, and then the priority of said another task is higher and, if it is determined as another task of a different user, it is determined that a new user needs to get in the queue, and the priority of said another task is not high. The above is only an example, and other conditions for determining the priority may be set.

Figure 3:
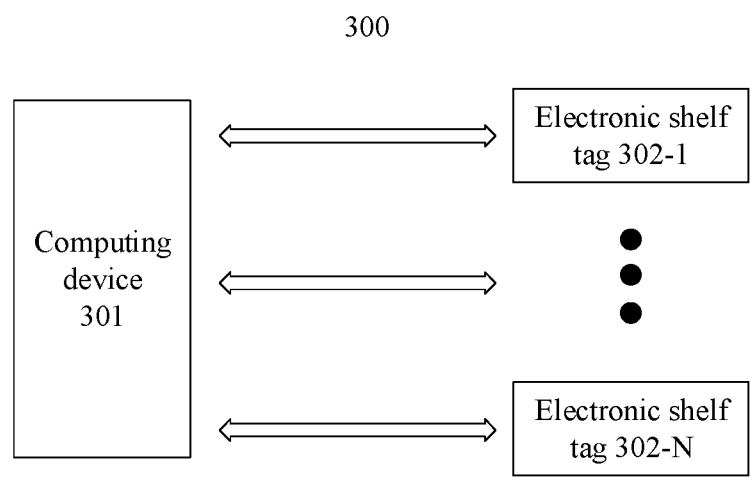
FIG. 3 is a schematic block diagram of a system for controlling an electronic shelf label according to an embodiment of the present disclosure.

FIG. 3 shows a schematic block diagram of a system 300 for controlling an electronic shelf label according to an embodiment of the present disclosure.

As shown in FIG. 3, the system 300 may include a computing device 301 and a plurality of electronic shelf labels 302-1, . . . , 302-N; the computing device 301 and different electronic shelf labels may be connected in a wired or wireless manner, different electronic shelf labels are connected or disconnected as needed. The computing device 301 may be a computing device 400 which will be described in detail later, and may execute the method 100 as previously described. The electronic shelf labels 302-1, . . . , 302-N may be electronic shelf labels 500, which will be described in detail later, and may execute the method 200 as previously described. The connection may be a wired connection or a wireless connection.

The computing device 301 is configured to control the plurality of electronic shelf labels 302-1, . . . , 302-N so as to enable a user to execute a plurality of tasks, thereby satisfying users' demands in learning and entertainment while satisfying their demands in shopping, which can improve the user's shopping experience.

FIG. 4 shows a schematic block diagram of a computing device 400 for controlling an electronic shelf label according to an embodiment of the present disclosure. The computing device 400 may, for example, execute the method 100 as previously described.

As shown in FIG. 4, the computing device 400 may include an identification apparatus 401, a retrieval apparatus 402, a task generation apparatus 403, a presentation apparatus 404, and a transmitting apparatus 405.

The identification apparatus 401 may be configured to identify a user type. The user type may be a user type as previously described.

The retrieval apparatus 402 may be configured to retrieve a task type matching the user type from a plurality of preset task types according to the user type.

The task generation apparatus 403 may be configured to generate a plurality of tasks based on the retrieved task type. In some embodiments, the task generation apparatus 403 may be configured to generate a plurality of tasks simultaneously based on the retrieved task type. In other embodiments, the task generation apparatus 403 may be configured to sequentially generate a plurality of tasks based on the retrieved task type and/or task execution results from a plurality of electronic shelf labels.

The presentation apparatus 404 may be configured to present the plurality of tasks. In some embodiments, the presentation apparatus 404 may be configured to simultaneously present the plurality of tasks. In other embodiments, the presentation apparatus 404 may be configured to sequentially present the plurality of tasks.

The transmitting apparatus 405 may be configured to transmit the plurality of tasks to a plurality of corresponding electronic shelf labels, respectively. In some embodiments, the transmitting apparatus 405 may be configured to simultaneously transmit the plurality of tasks to a plurality of corresponding electronic shelf labels, respectively. In another embodiment, the transmitting apparatus 405 may be configured to sequentially transmit the plurality of tasks to the plurality of corresponding electronic shelf labels, respectively.

As shown in FIG. 4, the computing device 400 may further include a receiving apparatus 406, which may be configured to receive task execution results of the plurality of electronic shelf labels. The task execution result may be received, for example, from a user, or may be received from an electronic shelf label. The task execution result may be, for example, a barcode or a two-dimensional code. In this embodiment, the task generation apparatus may be further configured to generate information related to the plurality of electronic shelf labels based on the task execution results. The information related to the plurality of electronic shelf labels includes favor information of products corresponding to the plurality of electronic shelf labels.

FIG. 5 is a schematic block diagram of an electronic shelf label 500 according to an embodiment of the present disclosure. The electronic shelf label 500 may, for example, execute the method 200 described above.

As shown in FIG. 5, the electronic shelf label 500 may include a receiving apparatus 501, a presentation apparatus 502, an identification apparatus 503, and a generating apparatus 504.

The receiving apparatus 501 may be configured to receive a task from the computing device 400, for example.

The presentation apparatus 502 may be configured to present a task to a user. The presentation can be implemented, for example, by a text, an image or sound.

The identification apparatus 503 may be configured to identify the user executing the presented task.

The generation apparatus 504 may be configured to generate a task execution result based on the user executing the presented task. In some embodiments, the generated task execution results may also be presented to the user.

In some embodiments, the electronic shelf label 500 may further include a transmitting apparatus 505. The transmitting apparatus 505 may be configured to transmit the task execution result.

In some embodiments, the electronic shelf label 500 may further include a retrieval apparatus 506. The retrieval apparatus 506 may be configured to retrieve a task from a preset task library based on the received task. In this embodiment, the received task may be, for example, only a code or a short name of a task, and a preset task library stores detailed tasks corresponding to the task code or short name. This setting can reduce the communication volume of the entire system, thereby increasing the operating speed of the entire system.

In some embodiments, the receiving apparatus 501 may be further configured to receive another task. Upon receiving said another task, the receiving apparatus 501, the presentation apparatus 502, the identification apparatus 503, and the generation apparatus 504 may suspend or terminate the executing of the current task. Thereafter, the presentation apparatus 502 may be configured to present said another task; the identification apparatus 503 may be configured to identify a user executing said another presented task; and the generation apparatus 504 may be configured to generate a task execution result based on the user' executing said another presented task. The above identification apparatus, retrieval apparatus, task generation apparatus, and generation apparatus may include at least one hardware processor that implements a corresponding function, and the presentation apparatus, the transmitting apparatus, and the receiving apparatus may be components that can implement the corresponding function.

An embodiment of the present disclosure also provides an electronic shelf label, including: a processor; a memory for storing executable instructions of the processor; wherein the processor is configured to: receive a task, for example from the computing device 400; presents a task, including presenting the task to a user, and the presentation may be implemented by, for example, a text, an image, or sound; identify a user executing the presented task; and generate a task execution result based on the user executing the presented task.

In some embodiments, the generated task execution result may also be presented to the user.

An embodiment of the present disclosure also provides a computing device. The computing device may include a memory and one or more processors (e.g., hardware processors). Computer-executable instructions are stored in the memory, and the computer-executable instructions, when run on the one or more processors, cause the one or more processors to execute methods and functions according to embodiments of the present disclosure.

An embodiment of the present disclosure also provides a non-transitory computer-readable storage medium on which computer-executable instructions are stored. When the computer-executable instructions run on one or more processors, the one or more processor are caused to execute methods and functions according to embodiments of the present disclosure.

An embodiment of the present disclosure also provides a computer program product. When the instructions in the computer program product are executed by a processor, the method according to the embodiment of the present disclosure can be implemented.

In the description of the present specification, the description of the terms "one embodiment", "some embodiments", "examples", "specific examples", or "some examples" and the like apparatus that the embodiments or examples described in combination specific features, structures, materials, or characteristics are included in at least one embodiment or example of the present disclosure. In this specification, the schematic expressions of the above terms are not necessarily directed to the same embodiment or example. Moreover, the particular features, structures, materials, or characteristics described may be combined in any suitable manner in any one or more embodiments or examples. In addition, without any contradiction, those skilled in the art may incorporate and combine different embodiments or examples and features of the different embodiments or examples described in this specification.

In addition, the terms "first" and "second" are used for descriptive purposes only and cannot be understood as indicating or implying relative importance or implicitly specifying the number of technical features indicated. Therefore, the features defined as "first" and "second" may explicitly or implicitly include at least one of the features. In the description of the present disclosure, the meaning of "a plurality" is at least two, for example, two, three, etc., unless it is specifically and specifically defined otherwise.

Any process or method description in a flowchart or otherwise described herein can be understood as representing modules, segments or sections of codes that include one or more executable instructions for implementing steps of a customized logic function or process, and the scope of the preferred embodiments of the present disclosure includes additional implementations in which the functions may be executed in an order other than what is shown or discussed (including in a substantially simultaneous manner or in a reverse order according to the functions involved). This should be understood by those skilled in the art to which the embodiments of the present disclosure belong.

Logic and/or steps represented in a flowchart or otherwise described herein, for example, a sequenced list of executable instructions that can be considered to implement a logical function, can be embodied in any computer readable medium to be applied by instruction execution systems, apparatuses, or devices (such as computer-based systems, systems that include processors, or other systems that can fetch and execute instructions from instruction execution systems, apparatuses, or devices), or in conjunction with these instruction systems, apparatuses, or devices. For the purposes of this specification, a "computer-readable medium" may be any apparatus that can contain, store, communicate, propagate, or transmit a program to be applied by instruction execution systems, apparatuses, or devices, or in conjunction with these instruction systems, apparatuses, or devices. More specific examples of the computer-readable medium may include, for example, the following: an electrical connection (electronic device) having one or more wirings, a portable computer disk case (magnetic device), a random access memory, a random access memory, a Read Only Memory, an Erasable Programmable Read Only Memory or a flash memory, a fiber optic device, and a Compact Disc Read Only Memory. In addition, the computer-readable medium may even be paper or other suitable medium on which the program can be printed, since, for example, by optically scanning the paper or other medium, followed by editing, interpretation, or other suitable processing, the program can be obtained electronically and then stored in a computer memory.

It should be understood that portions of the present disclosure may be implemented in hardware, software, firmware, or a combination thereof. In the above embodiments, multiple steps or methods may be implemented by software or firmware stored in a memory and executed by a suitable instruction execution system. For example, if it is implemented in hardware, it may be implemented in any one of the following technologies or a combination thereof known in the art: a discrete logic circuit having a logic gate circuit for implementing a logic function on data signals, a suitable combination application specific integrated circuit for logic gate circuits, Programmable Gate Arrays, Field Programmable Gate Arrays, etc.

Those of ordinary skill in the art may understand that all or part of the steps of the method in the above embodiments may be implemented by a program instructing related hardware. The program may be stored in a computer-readable storage medium. When the program is executed, it includes executing one or a combination of steps of a method embodiment.

In addition, each functional unit in each embodiment of the present disclosure may be integrated into one processing module, or each of the units may exist separately physically, or two or more units may be integrated into one module. The above integrated modules may be implemented in the form of hardware or software functional modules. If the integrated module is implemented in the form of a software functional module and sold or used as an independent product, it may also be stored in a computer-readable storage medium.

Although the embodiments of the present disclosure have been illustrated and described above, it can be understood that the above embodiments are exemplary and should not be construed as limiting the present disclosure. Those of ordinary skill in the art could make variations, modifications, and replacements to the above embodiments within the scope in the present disclosure.

What is claimed is:

1. A method for controlling an electronic shelf label, comprising:
    retrieving a task type matching a user type from at least one preset task type according to the user type as acquired, the user type comprising at least one of a gender or an age of a user;
    generating a task flow based on the task type as retrieved;
    generating a message reminding the user to complete the task flow;
    transmitting information related to the task flow to the electronic shelf label;
    receiving task flow execution results of the electronic shelf labels; and
    generating information related to the plurality of electronic shelf labels based on the task flow execution results, wherein, when one of the task flow execution results is an intermediate result, the generated information related to the plurality of electronic shelf labels comprises information related to a next task step in the task flow.

2. The method according to claim 1, wherein:
    the task flow comprises a plurality of task steps; and
    transmitting information related to the task flow to the electronic shelf label comprises transmitting information related to the plurality of task steps to a plurality of corresponding electronic shelf labels, respectively.

3. The method according to claim 1, wherein:
    generating a task flow based on the task type as retrieved comprises simultaneously generating the plurality of task steps based on the task type as retrieved; and
    transmitting information related to the plurality of task steps to a plurality of corresponding electronic shelf labels comprises simultaneously transmitting information related to the plurality of task steps to the plurality of corresponding electronic shelf labels, respectively.

4. The method according to claim 1, wherein:
    generating the task flow based on the task type as retrieved comprises sequentially generating a plurality of task steps based on at least one of the task type as retrieved and task step execution results from a plurality of electronic shelf labels; and
    transmitting information related to the plurality of task steps to a plurality of corresponding electronic shelf labels comprises sequentially transmitting information related to the plurality of task steps to a plurality of corresponding electronic shelf labels, respectively.

5. A non-transitory computer-readable storage medium containing computer-executable instructions, the computer-executable instructions, when being executed by one or more hardware processors, cause the one or more hardware processors to execute the method according to claim 1.

6. A computing device for controlling an electronic shelf label, comprising:
   an acquiring apparatus configured to acquire a user type;
   a retrieval apparatus configured to retrieve a task type matching the user type from a plurality of task types according to the user type as acquired;
   a task generation apparatus configured to generate a task flow based on the task type as retrieved;
   a reminding apparatus configured to remind a user to execute the task flow;
   a transmitting apparatus configured to transmit information related to the task flow to an electronic shelf label; and
   a receiving apparatus configured to receive task flow execution results of the electronic shelf label,
   wherein the task generation apparatus is further configured to generate information related to the electronic shelf label based on the task flow execution results, wherein, when one of the task flow execution results is an intermediate result, the generated information related to the plurality of electronic shelf labels comprises information related to a next task step in the task flow.

7. The computing device according to claim 6, wherein the task flow comprises a plurality of task steps, and the transmitting apparatus is configured to transmit information related to the plurality of task steps to a plurality of corresponding electronic shelf labels, respectively.

8. The computing device according to claim 7, wherein:
   the task generation apparatus is configured to generate a plurality of task steps simultaneously based on the task type as retrieved; and
   the transmitting apparatus is configured to simultaneously transmit information related to the plurality of steps to a plurality of corresponding electronic shelf labels, respectively.

9. The computing device according to claim 7, wherein:
   the task generation apparatus is configured to sequentially generate a plurality of task steps based on at least one of the task type as retrieved and task step execution results from a plurality of electronic shelf labels; and
   the transmitting apparatus is configured to sequentially transmit information related to the plurality of task steps to the plurality of corresponding electronic shelf labels, respectively.

10. A system for controlling an electronic shelf label, comprising the computing device for controlling the electronic shelf label according to claim 6 and the electronic shelf label.

11. A system, comprising:
    at least one computing device comprising at least one hardware processor; and
    program instructions stored in memory and executable by the at least one computing device that, when executed, direct the at least one computing device to:
      retrieve a task type matching a user type from at least one preset task type according to the user type as acquired, the user type comprising at least one of a gender or an age of a user;
      generate a task flow based on the task type as retrieved;
      generate a message reminding the user to complete the task flow;
      transmit information related to the task flow to the electronic shelf label;
      receive task flow execution results of the electronic shelf labels; and
      generate information related to the plurality of electronic shelf labels based on the task flow execution results, wherein, when one of the task flow execution results is an intermediate result, the generated information related to the plurality of electronic shelf labels comprises information related to a next task step in the task flow.

\* \* \* \* \*